United States Patent [19]
Gajewski et al.

[11] Patent Number: 4,934,425
[45] Date of Patent: Jun. 19, 1990

[54] NON-PNEUMATIC TIRE

[75] Inventors: Vincent J. Gajewski, Cheshire; Wallace I. Goddard, Southbury; Richard L. Palinkas, Northfield; George H. Nybakken, Middlebury, all of Conn.

[73] Assignee: Uniroyal Chemical Company, Inc., Middlebury, Conn.

[21] Appl. No.: 172,039

[22] Filed: Mar. 23, 1988

[51] Int. Cl.$^5$ .................... B60C 1/00; B60C 7/00
[52] U.S. Cl. ........................................ 152/323
[58] Field of Search ............ 152/452, 152, 525, 564, 152/323–329; 528/76; 521/414; 301/63 PW, 39 R, 39 T

[56] References Cited

U.S. PATENT DOCUMENTS 3,798,200  3/1974  Kaneko et al. .
3,963,681  6/1976  Kaneko et al. .
3,980,606  9/1976  Werner .
4,017,464  4/1977  Kimball ........................ 528/76 X
4,182,825  1/1980  Jackle .

FOREIGN PATENT DOCUMENTS 159888  10/1985  European Pat. Off. .

OTHER PUBLICATIONS

"Akron Beacon Journal", Feb. 27, 1987, pp. D9; D10.
"Detroit News", Feb. 27, 1987, pp. 1A; 8A.
"European Rubber Journal", Mar. 1987, p. 5.

Primary Examiner—Michael W. Ball
Assistant Examiner—Geoffrey L. Knable
Attorney, Agent, or Firm—Raymond D. Thompson

[57] ABSTRACT

A non-pneumatic tire is disclosed having a polyether polyol urethane elastomeric body with a plurality of angular radial ribs interconnected by webbing. The urethane is formed of at least two isocyanate-end capped polyether polyols of differing molecular weights to yield a tire with improved highway life and good vehicle ride characteristics.

7 Claims, 2 Drawing Sheets

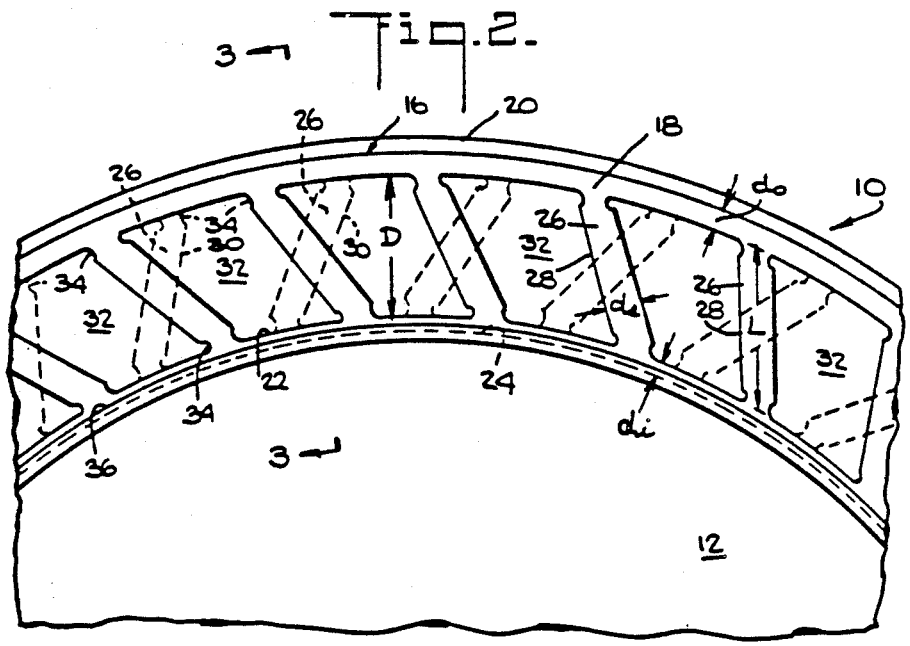
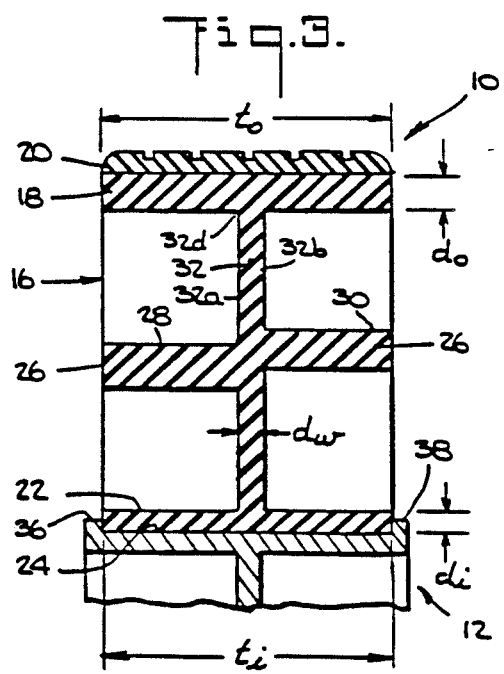

NON-PNEUMATIC TIRE

BACKGROUND OF THE INVENTION

This invention relates to non-pneumatic tires having angularly oriented ribbed members and webs between ribs composed of resilient polyether urethane elastomeric materials. In particular, a urethane made of polyether polyols having two distinctly different molecular weights are used to make the urethane elastomer.

Urethanes have been used in the manufacture of solid tires useful for such applications as industrial tires, off-the-road tires, bicycles tires and the like. They have not been entirely satisfactory in such applications because such urethane solid tires do not have the proper cushioning and handling characteristics for a soft vehicle ride on such applications as passenger vehicles. Also, such solid tires suffer from internal heat build-up and subsequent degradation of the elastomer material in prolonged high speed service conditions or under rough terrain situations where the tire is being deformed.

Various polyurethane elastomers have been proposed for use on such solid tires, including those described in U.S. Pat. No. 3,798,200 and U.S. Pat. No. 3,963,681 both to Kaneko et al. In these two pieces of prior art it is proposed that polyether urethane elastomers can be utilized which are prepared from two prepolymers having differing molecular weights. In 3,963,681 it is disclosed that by using a flex life test such De Mattia it is determined that the preferred urethane elastomer is one prepared using a polyfunctional isocyanate and a polyether prepared using prepolymers having different average molecular weights. It is further disclosed that for polytetramethylene ether glycol the critical molecular weight is 4,500. One of the two polyethers used to make the invention must have a molecular weight above the 4,500 critical molecular weight and the other must be below this critical molecular weight in order to achieve the improved De Mattia flex life. U.S. Pat. No. 3,798,200 discloses a 4,000 critical molecular weight for polytetramethylene glycol ethers utilized in the urethane teaches that the average weight of the two polyethers must lie between 4,500 and 20,000 weight average molecular weight. It further teaches that one of the polyethers must lie below the critical molecular weight of 4,500 and the other be above such a critical molecular weight. In comparative Example 9, composition outside of the invention of the reference is described in which a 1,900 molecular weight polyether and an 850 molecular weight is blended 50:50, reacted with 2 mols of 2,4 tolylene diisocyanate and subsequently cured with methylene bis ortho-chloroaniline. Such a composition was found to have poor cut growth and flex crack resistance as measured by De Mattia flex testing.

Contrary to the teachings of 3,798,200, it has been quite unexpectedly found that a non-pneumatic tire utilizing a rib-and-web structure of this invention yields a non-pneumatic tire which can favorably compare with pneumatic tires for service life under both high speed, long duration test conditions and under very rough road conditions while still giving good ride and handling characteristics similar to a pneumatic tire. Such a device of the invention is superior to a pneumatic tire in that it cannot be punctured or damaged in the way a pneumatic can.

The non-pneumatic tire concept set forward in European patent publication number 159,888 which claimed convention priority from U.S. Pat. application No. 600,932 filed Apr. 16, 1984, introduced a configuration of tire which utilized an entirely new design approach to a high speed non-pneumatic tire having suitable ride characteristics for passenger tires. This design features the ability of the ribs and webs to provide a variable spring rate in the tires and enables it to deform locally when an obstacle is encountered on a rough road driving condition. These requirements are in addition to the common requirements which were encountered in previous generations of solid tires that the internal heat build-up be kept to a minimum and the flex life of the tire be long.

In view of the unique requirements of structure as a object of the invention to provide a urethane material which can endure both long duration, high speed conditions as well as the ability to locally deflect in rough terrain service. It is a further object to provide a non-pneumatic tire having good vehicle ride characteristics under a variety of road conditions. In order to achieve such results, it is necessary to recognize that dynamic modulus of the material is critically important as well as flex fatigue life and dynamic heat build-up properties (hysteresis). The recognition of the criticality of utilizing a urethane with two distinct molecular weight glycols with an organic diamine curative provided the balance in properties required for good vehicle ride characteristics as well as long life.

BRIEF DESCRIPTION OF THE INVENTION

In accordance with one embodiment of the invention there is provided: a non-pneumatic tire rotatable about an axis, having improved hysteresis and flex fatigue resistance comprising: an annular body of resilient polyether urethane elastomeric material formed of a first isocyanate end capped low molecular weight polyether polyol having a molecular weight of between 200 and 1,500 and a second high molecular weight isocyanate end capped polyether polyol having a molecular weight between 1,500 and 4,000 cured with an aromatic diamine curative, said annular body having a generally cylindrical outer member at the outer periphery thereof, a generally cylindrical inner member spaced radially inward from and coaxial with said outer member, a plurality of axially extending, circumferentially spaced-apart rib members connected at their corresponding inner and outer ends to said inner and outer cylindrical members, said rib members being generally inclined at an angle of about 0° to 75° to radial planes which intersect them at their inner ends, and at least one web member having opposite side faces, said web member having its inner and outer peripheries connected respectively to said inner and outer cylindrical members, said web member being connected on at least one of its side faces to at least one of said rib members to thereby form with said rib member a loadcarrying structure for said outer cylindrical member, said load carrying structure being constructed to permit locally loaded members to buckle.

BRIEF DESCRIPTION OF DRAWINGS

FIG. 2 is an enlarged fragmentary view of a portion of the tire and rim assembly shown in FIG. 1, showing the intermediate load-carrying and cushioning structure thereof in greater detail; and FIG. 3 is a sectional elevation view, taken along the line 3—3 of FIG. 2, showing one single-web member version of this invention.

DETAILED DESCRIPTION OF THE INVENTION

Figure 1:
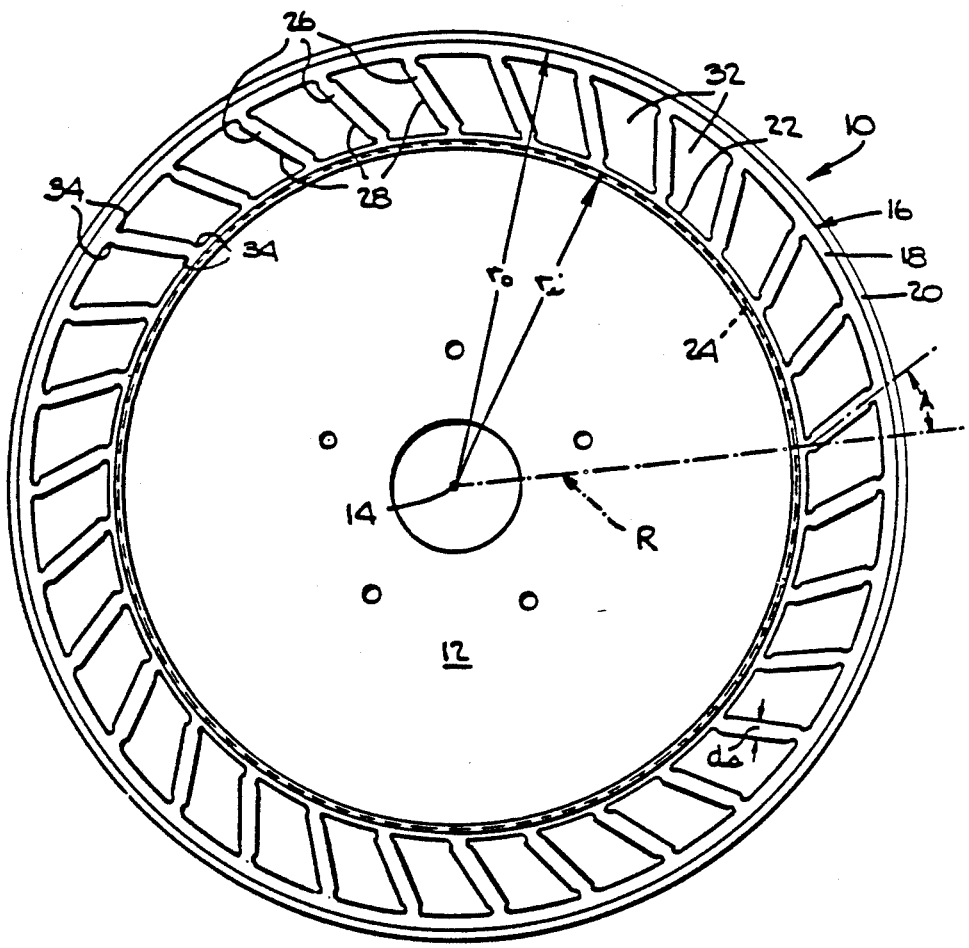
FIG. 1 is a side elevation view of a non-pneumatic tire and rim assembly embodying the invention.

Referring to FIGS. 1, 2 and 3 wherein a preferred embodiment of this invention is illustrated, a tire 10 is shown mounted on a wheel 12 for rotation about an axis 15. The tire 10 comprises an annular body 16 of resilient elastomeric material having an outer cylindrical member 18 at the outer periphery thereof on which a tread 20 may be mounted. The annular body 16 is also provided with an inner cylindrical member 22 at its inner periphery which is adhered to or otherwise fastened to an outer cylindrical surface 24 of wheel rim member 12. Inner cylindrical member 22 is of the same length as, coaxial to, and coextensive with outer cylindrical member 18.

The outer cylindrical member 18 is supported and cushioned by a plurality of circumferentially spaced-apart rib members 26, each of which includes a first axial portion 28 (FIG. 3) and a second axial portion 30, and by a web member 32, which in this embodiment of the invention is planar and is connected on one of its side faces 32a to the first portion 28 of rib members 26 and is connected on its other side face 32b to the second portion 30 of rib members 26.

The planar web member 32 is positioned midway between the axial ends of the inner and outer cylindrical members 18 and 22. It is connected at its inner periphery 32c to the inner cylindrical member 22 and is connected at its outer periphery 32d to the outer cylindrical member 18. Similarly, the various rib members 26 (FIG. 2) are connected at their radially inner ends to the inner cylindrical member 22 and at their radially outer ends to the outer cylindrical member 18. The ribs 26 are preferably undercut where their ends connect to the inner and outer cylindrical members, as shown at 34, to enhance flexibility of the connection.

The rib members 26 extend generally axially along the inner and outer cylindrical members 22 and 18 (FIG. 3) and, in the preferred embodiment as shown in FIG. 1 are inclined at an angle A (FIG. 1) of 15° to 75° to radial planes R which intersect them at their functions with the inner cylindrical member 22. In an alternate embodiment (not shown), the rib members 26 can be extended radially with no angle A or with a lesser angle of between 0° and 15°. The web member 32 (FIG. 3) in this embodiment lies in a plane that is perpendicular to the rotational axis 14 of the tire 10.

In the preferred embodiment shown in FIGS. 1 to 3, the first axial rib member portions 28 and the second axial rib member portions 30 are each inclined at the same angle to the radial planes R which intersect them at their radially inner ends but the angles of the first portions 28 are preferably oppositely directed with respect to the radial planes R from the angles of the second portions 30. Thus, as viewed in FIG. 3, the first rib portion proceeds upwardly from the section lines to connect with the outer cylindrical member 18, while the second rib portion 30 proceeds downwardly from the section lines to connect with the inner cylindrical member 22.

In FIGS. 1-3, "$r_o$" is the outer radius of the annular body 16, "A" is the inclination angle that the rib members 26 make with the radial planes R, "$d_i$" is the radial thickness of the inner cylindrical member 22, "$d_o$" is the radial thickness of the outer cylindrical member 18, "L" is the angularly directed length of the rib members 26, "D" is the radial distance from the outer surface of the inner cylindrical member 22 to the inner surface of the outer cylindrical member 18, "$d_w$" is the axial thickness of the web member 32, "$d_s$" is the thickness of the rib member 26 measured perpendicularly to its length L, "$t_i$" is axial length of the inner cylindrical member 22, "$t_o$" is the axial length of the outer cylindrical member 28, and "$t_i'$" is the radial dimension of the inner surface of the inner cylindrical member 22.

In a tire of the type shown in FIGS. 1-3, the rib members 26 are constrained to deform primarily in compression by the influence of the web member 32, which may be cast as an integral part of the structure. The web member 32 tends to prevent the rib members 26 from deforming in bending, and the effect is to greatly increase structural stiffness. In addition, the rib members 26 tend to prevent the web member 32 from buckling in the axial direction so the rib members and web member work together synergistically to carry tire loads.

Another desirable characteristic of a non-pneumatic tire or any tire is an overall spring rate that changes depending on the type of surface against which the tire is loaded. Specifically, it is desirable that the spring rate be lower over a bump or cleat than over a flat surface.

The annular body 16 may be adhered to the surface 24 of wheel rim 12 by being molded directly thereto in a liquid injection molding process, with the outer cylindrical surface 24 of the rim having been prepared in accordance with known processes to adheringly receive the elastomeric material of the body 16. Preferably, the wheel rim 12 is provided with radial flanges 36 and 38 which cooperate with the mold in forming the annular body 16 on the wheel rim surface 24.

Method of Manufacture

The tire can be conveniently made in a mold having an inner cavity of complementary shape to the tire 10 shown in FIGS. 1-3. The mold may have an inner mold ring substituted in place of the wheel rim 12. The mold is filled with a reaction mixture of the preferred components of the invention.

The reaction mixture is added to the mold under sufficient pressure to insure that all air in the mold is displaced by liquid reaction mixture. It has been found that pressure in the area of 450 kPa is a suitable pressure. Once the mold is filled it is heated for about one hour for the purpose of curing the liquid reactants. Subsequently, the mold is opened and the annular body 16 is demolded and post-cured for a suitable number of hours.

A simple tire tread composed of tough abrasion-resistant elastomer such as conventional tire treads are manufactured from is applied to the outer cylindrical member 18. The tread has a minimal thickness to assure little heat build-up during flexing. A thickness of about 0.6 cm has been found suitable. The tread may be adhered by conventional and well-known adhesives which vary depending on the composition of the tread. If an inner mold ring has been substituted for the wheel rim 12, the rim 12 must be adhered by suitable adhesives to the inner surface of the annular body 16. The resulting assembly can be used to replace a conventional passenger car tire and wheel assembly. A car with the tire and wheel assembly can be driven without deleteriously affecting control of the car without damage to the non-pneumatic tire of the invention.

Urethane Elastomer of the Invention

The invention resides in the specific selection of a polyether polyol prepolymer for the urethane elastomer which has at least two distinct molecular weight polyols included in the prepolymer system.

The polyether used in this invention is the polyether having a terminal functional group containing active hydrogen capable of reacting with an isocyanate group. The functional group is selected from the group consisting of hydroxyl group, mercapto group, amino group and carboxyl group.

Moreover, a pre-extended polymer obtained by reaction between a low molecular weight polymer and a diisocyanate or a product obtained by reaction between prepolymer and diol compound may be used in this invention.

Polyethers used in this invention are alkylene glycol such as polyethylene glycol, polypropylene glycol, polytetramethylene ether glycol and the like, polyalkylene triol such as polypropylene triol and the like, polyalkylene dicarboxylic acid, polyalkylene dithiol, polyalkylene diamine and their pre-extended polymer, and preferably polyalkylene glycol, and more preferably polytetramethylene ether glycol and its pre-extended polymer.

In this invention, a mixture of two or more different kinds of polyethers having molecular weights which are different from each other must be used. In this case, it is essential that at least one peak is located at the lower molecular weight region (200-1,500) and at least one peak is located at the higher molecular weight region (1,500-4,000).

Polytetramethylene ether glycol (PTMEG) is the most preferred polyol of the invention. A first low molecular weight polyether glycol is utilized having a molecular weight of between 200 and 1,500. The essential second higher molecular weight polyether glycol has a molecular weight between 1,500 and 4,000. A more preferred range for the low molecular weight material is between 250 and slightly above 1,000. For the higher molecular weight second glycol, it is just below 2,000 to about 3,000. The most preferred range is is a low molecular weight glycol of about 1,000 molecular weight and a higher molecular weight glycol of about 2,000. The first and second polyether polyols may be blended in molar ratios of between 95:5 to 50:50 where the first number in the ratio is always the low molecular weight polyol. More preferred range is 90:10 to 60:40. The most preferred range is 85:15 to 80:20.

The prepolymer for use in the tire of the invention is formed by reacting the first and second polyether polyols set forth above with a multifunctional isocyanate. The more preferred are the toluene diisocyanates. The two most preferred materials are 100% 2,4 toluene diisocyanate and the 80/20 blend of the 2,4 and 2,6 toluene diisocyanate isomers. The ratio of TDI to polyol is commonly expressed in the art as NCO:OH ratio. The isocyanate to polyol ratio may be in the range of 1.7:1.0 to 2.3:1.0. A more preferred range of ratios is 1.85:1.0 to 2.2:1.0. The most preferred range of ratios is 1.95:1.0 to 2.15:1.0. The percentage of free NCO in the resulting prepolymer is also in common use for characterizing prepolymers.

Polyfunctional isocyanates used in this invention are not particularly limited, but are preferably aromatic and aliphatic diisocyanates and triisocyanates. Aromatic diisocyanates are, for example:
tolylene-2,4-diisocyanate;
tolylene-2,6-diisocyanate;
naphthalene-1,5-diisocyanate;
diphenyl-4,4'-diisocyanate;
diphenylmethane-4,4'-diisocyanate;
dibenzyl-4,4'-diisocyanate:
stilbene-4,4'-diisocyanate;
benzophenone-4,4'-diisocyanate;
and their derivatives substituted with alkyl alkoxy, halogen or nitro groups, e g.,
3,3'-dimethylphenyl-4,4'diisocyanate or
3,3'-dichlorodiphenylmethane diisocyanate, their mixtures and the like, aliphatic diisocyanates, and tricyanates.

Among them, there may be preferable used:
tolylene-2,4-diisocyahate:
tolylene-2,6-diisocyanate;
naphthalene-1,5-diisocyanate;
diphenyl-4,4'-diisocyanate;
diphenylmethane-4,4'-diisocyanate;
1,6-hexamethylene diisocyanate;
1,3 and 1,4-cyclohexyl diisocyanate;
methylene bis(4-cyclohexyl diisocyanate);
1,3- and 1,4-xylene diisocyanate and their mixtures.

The curing agents in this invention may be aromatic or aliphatic polyamines or polyols. Aromatic diamines are, for example, 4,4'methylene bis(2-chloroaniline), 2,2',5-trichloro-4,4'-methylenediamines, napthalene-1,5-diamine, ortho, meta, paraphenylenediamine, tolylene-2,4-diamine, dichlorobenzidine, diphenylether-4,4'-diamine, their derivatives and mixtures.

Among them there are preferably employed 4,4'methylene bis 2-chloroaniline, methylene dianiline, trimethyl bis(p-amino benzoate), bis amino phenylthioethane, napthalene-1,5-diamine, dichlorobenzidine, diphenylether, 4,4'-diamine, hydrazine, ethylenediamine, hexamethylene-1,6-diamine, piperazine, ethylene glycol, 1,3-propylene glycol, 1,3 and 1,4-butane diol, trimethylpropane and their mixtures.

The final urethane elastomer is cured using aromatic organic diamines which are well-known and commercially available. The more preferred material is 4,4'-methylene bis(2-chloroaniline) which will periodically be referred to as MBOCA. Also preferred is the diethyl toluene diamine (DETDA) which is available commercially from Ethyl Corporation under the trade name Ethacure 100. A suitable material which has a different cure rate is methylenedianiline-NaCl complex, commercially available from Uniroyal Chemical Company, Inc. as Caytur. The most preferred curative is 4,4'-methylene bis(2-chloroaniline).

The stoichiometry of the prepolymer to curative is expressed on a molar equivalence basis, hereinafter called equivalence ratio, rather than on a weight basis. The broadest equivalence ratio of prepolymer to curative is about 80 to about 115. More preferred is 90 to 110 and most preferred is 100 to 105. The equivalence ratio is also commonly called - percent of theory - or simply stoichiometry.

It has been found through a long process of experimentation that several dynamic properties of elastomers must be carefully evaluated together in order to produce an elastomer suitable for the annular elastomeric body of the tire of this invention. A measure of dynamic modulus must reveal that the chosen elastomeric material has a relatively constant dynamic modulus over a wide temperature range. The tendency of the elastomer to build up internal heat due to elastic inefficiency is commonly called hysteresis in the industry. The hysteresis is commonly expressed in terms of a value obtained from a hysteresis-type test which is commonly described as tangent delta or, more commonly, tan δ. The tan δ should show a decrease with a rise in temperature, indicating little internal heat build-up is occurring in the elastomeric body of article being tested.

The flex fatigue test helps measure the ability of the elastomer to withstand the millions of cycles to which a non-pneumatic tire may be subjected. The test which has been found to correlate favorably with actual test tires is the cut growth resistance as run in accordance with ASTM D-3629-78. Test conditions are: temperature 70° C., atmosphere is air, rate of rotation is 500 rpm and elongation is 23%. The device utilized is the TEXUS ® Flex tester available from Testing Machines, Inc., New York, Model No. 31-11.

Dynamic measurements to determine a tan δ value are useful to assure that a suitably low hysteresis value is obtained for the material. Several hysteresis devices are useful including the Rheovibran Tester, Hysterometer, and the Rheometrics Viscoelastic Tester for Solids, Model RVE-S, made by Rheometrics, Inc., New Jersey. These instruments impose a sinusoidal shear strain to the specimen, and analyze the torque responses and phase relation to the strain.

The ultimate test of the suitability of an elastomer for use in a high speed tire is its ability to resist heat build-up and degradation at prolonged high speed service. United States Department of Transportation has developed a test designated MVSS 109 high speed test procedure S5.5 in which the test wheel and tire is run on a dynamometer at carefully prescribed strain loads, dynamometer speeds and time periods. This test is designed for a pneumatic tire. The following is a simplified indication of the test regimen, specific details can be obtained by review of MVSS 109. Load (NPS) 92% of maximum rated load in a 40° C. elevated temperature environment. Table I shows the speed intervals at which the tires described in the examples were run. The MVSS 109 test reviewed call for test termination after 3½ hours (top speed 85 mph). However, in order to induce failure in the test tires, the test was continued as noted in Table I with incremental speed increases until the tires failed.

TABLE I

| MVSS 109 Test Method | | | |
|---|---|---|---|
| MVSS 109 Test Conditions | | | |
| | Speed (MPH) | Internal (Hours) | Cummulative (Hours) |
| Load (NPS) 0.92 max load | 50 | 2 | 2 |
| | 75 | ½ | 2½ |
| | 80 | ½ | 3 |
| | 85 | ½ | 3½* |
| | 90 | ½ | 4 |
| | 95 | ½ | 4½ |
| | 100 | ½ | 5 |
| | 105 | ½ | 5½ |
| | 110 | ½ | 6 |
| | 115 | ½ | 6½ |
| | 120 | ½ | 7 |
| | 125** | ½ | 7½ |

*MVSS 109 is stopped after 3½hours @ 85 mph.
**125 mph maintained for any additional time periods.

In order to determine the ultimate capability of a tire to withstand highway conditions, this test was run beyond its normal termination time of 3½ hours to distinguish between materials used in the manufacture of the tire. Therfore, the life of the tire in hours may exceed the 3½ hour test specified in the Test Method.

SAMPLE AND TIRE PREPARATION PROCEDURE

Comparative A–C and Examples 1,2

The polyether urethane compositions of Comparative A, B, and C, were prepared by reacting a polytetramethylene ether glycol (nominal number average molecular weight of 1,000) with toluene diisocyanate in ratios sufficient to produce a prepolymer having the NCO/OH ratio shown in Table II.

The prepolymers were then reacted with the designated diamine curative in the indicated ratios. It is conventional and well-known that the curative and prepolymer may have to be preheated to facilitate handling of the materials. If a small sample is being prepared for physical testing, the mixing is done batchwise in appropriate quantities. If the tire of FIGS. 1–3 is being produced, the curative and prepolymer are pumped continuously into a mixing head which injects the reaction mixture into a mold as earlier described under the subsection Methods of Manufacture.

Example 1 of the invention was prepared by sequentially reacting each polytetramethylene ether glycol with sufficient quantities of 80/20 2,4/2,6 TDI to form two distinct prepolymers which were then mixed in the indicated molar ratio with the MBOCA curative as previously described.

Example 2 illustrates the most preferred method of manufacturing the tire of the invention. The 1,000 and 2,000 molecular weight PTMEG polyols are pre-blended prior to forming the prepolymer with TDI. The prepolymer is then reacted with the MBOCA curative to form the tire. This preblending of the polyols produces optimal properties in the tire as measured by TEXUS ® Flex as shown in Table II under Test Results.

TABLE II

| | Comparatives | | | Examples | |
|---|---|---|---|---|---|
| | | | | 1 | 2 |
| | | | | Blended | Preblended |
| | A | B | C | Prepolymers | PTMEG |
| Prepolymer Composition | | | | | |
| PTMEG (1000 molecular wt.) | 100 | 100 | 100 | 85 | 85 |
| PTMEG (2000 molecular wt.) | | | | 15 | 15 |
| 2,4 toluene diisocyanate | X | | X | | |

TABLE II-continued

|  | Comparatives | | | Examples | |
|---|---|---|---|---|---|
|  | A | B | C | 1 Blended Prepolymers | 2 Preblended PTMEG |
| 2,4-2,6 toluene diisocyanate (80/20 blend) |  | X |  | X | X |
| NCO/OH Ratio | 2:1 | 2:1 | 2:1 | 2.15:1 | 2.15:1 |
| % NCO | 5.0 | 6.3 | 6.3 | 6.3 | 6.3 |
| *Curative* |  |  |  |  |  |
| 4,4-methylene bis(2-chloroaniline) | X | X | X | X | X |
| Equivalence Ratio | 100 | 100 | 100 | 100 | 100 |
| *Physical Properties* |  |  |  |  |  |
| Hardness (Shore A durometer) | 92 | 96 | 95 | 95 | 95 |
| Tensile, psi | 5800 | 4700 | 6500 | 4730 | 4600 |
| Elongation, % | 420 | 410 | 380 | 390 | 410 |
| *Modulus, psi* |  |  |  |  |  |
| 100% | 1400 | 1640 | 1800 | 1810 | 1730 |
| 200% | — | 2070 | — | 2260 | 2120 |
| 300% | 2600 | — | 4300 | 3130 | 2750 |
| *Dynamic Properties |  |  |  |  |  |
| Flex fatigue, cycles (TEXUS ® Flex 70° C. @ 23% elongation) | 3200 | 5000 | 2750 | 11250 | 13500 |
| Tire Life, Hours (MVSS 109-mph at failure) | 2.0 (50 mph) | 4.25 (90 mph) | 3.28 (80 mph) | 5.50 (105 mph) | — |

*Dynamic properties values are average of following number of samples:
A-average of 3;
B-average of 2;
C average of 5;
Example 1-average of 2;
Example 2-single value.

The dynamic properties of Examples 1 and 2 illustrate the dramatic advancement achieved by using blended PTMEG prepolymers of different molecular weight to produce the non-pneumatic tire of FIGS. 1-3. The flex fatigue life of Example 1 is 135% better than the best of the Comparative Examples-(B). The life of the tire of Example 1 is dramatically better, both in duration and the ultimate speed capabilities. Example 1 lasted for 5.5 hours with the tire achieving a speed of 105 mph in the final 30 minutes, as shown in Table I. By contrast, the best of the Comparative (B) failed at 4.25 hours at 90 mph. U.S. Pat. No. 3,798,200 and 3,963,681 to Kaneko utilized similar polyether urethane chemistry to yield the conclusion that the average molecular weight of a mixture of polyethers must fall in the range of 4,500 to 20,000 average molecular weight 1,000 to 4,500 with the requirements that the molecular weight of one polyether be less than 4,500 and another must be above 4,500. The specific molecular weight ranges were selected based on cut growth and flex crack resistance as measured according to De Mattia fatigue tester. Surprisingly, our invention relates to an appreciation that excellent tensile strength and, more importantly, superior high speed tire performance in actual road condition results from utilizing two distinct molecular weight polyethers in the ranges of 200 to 1,500 and 1,500 to 4,000. Comparative Examples 9 and 10 in U.S. Pat. No. 3,798,200 indicates that cut growth and flex crack resistance is poor using the De Mattia flex results. Therefore, this prior art reference teaches specifically away from the applicant's invention in which it has been appreciated that a combination of physical properties relate most favorably and are positively correlated with superior tire performance on both the dynamometer-type test as set out in MVSS 109 and in actual road courses. The average molecular weight should lie between 1,000 and 2,000 which is contrary to the teachings and conclusions of U.S. Pat. No. 3,798,200 and 3,963,681.

This invention resides in the recognition of the superior performance provided by a tire of the physical characteristics previously described (ribs and web structure) in conjunction with this specific polyether urethane chemistry. This combination yields a tire which is non-pneumatic in character but which can perform on the highway with durability and vehicle handling characteristics similar to a pneumatic tire.

It will be readily apparent to the skilled practitioner in the art that many modifications and changes can be made to the embodiments specifically documented herein. Such modification and changes are a part of the invention if they fall within the scope of the invention defined in the appended claims hereto.

What is claimed is:

1. A non-pneumatic tire rotatable about an axis, having improved hysteresis and flex fatigue resistance comprising: an annular body deformable while in a state of compression of resilient polyether urethane elastomeric material formed of about 95 to 50 mol percent of a first low molecular weight polytetramethylene ether glycol having a molecular weight of between 200 and 1,500 and about 5 to 50 mol percent of a second higher molecular weight polytetramethylene ether glycol having a molecular weight between 1,500 and 4,000 said first and second glycols being toluene diisocyanate end capped and cured with an aromatic diamine curative, said annular body having a generally cylindrical outer member at the other periphery thereof, a generally cylindrical inner member spaced radially inward from and coaxial with said outer member, a plurality of axially extending, circumferentially spaced-apart rib members connected at their corresponding inner and outer ends to said inner and outer cylindrical members, said rib members being generally inclined at an angle of about 0° to 75° to radial planes which intersect them at their inner ends, and at least one web member having opposite side faces, said web member having its inner and outer peripheries connected respectively to said inner and outer cylindrical members, said web member being connected on at least one of its side faces to at least one of said rib members to thereby form with said rib member a load-carrying structure for said outer cylindrical member, said load-carrying structure being constructed to permit locally loaded members to buckle.

2. A tire according to claim 1 wherein said aromatic diamine curative is 4,4'-methylene bis(2-chloroaniline).

3. A tire according to claim 1 wherein said first polytetramethylene ether glycol has a molecular weight of about 1,000 and said second polytetramethylene ether glycol has a molecular weight of about 2,000.

4. A tire according to claim 1 wherein said polyether urethane elastomer has a molar equivalence ratio range of said first and second isocyanate end capped glycol to aromatic diamine curative of about 80 to about 115.

5. A tire according to claim 1 wherein the ratio of NCO to OH is in the range of about 1.85:1.0 to about 2.2:1.0.

6. A tire according to claim 5 wherein the ratio of said first polytetramethylene ether glycol and said second polytetramethylene ether glycol is from about 90:10 to about 60:40.

7. A tire according to claim 2 further comprising a third isocyanate end capped glycol of a polypropylene glycol with a molecular weight between about 1,000 and about 4,000, present in molar ratio to the molar sum of said first and second glycol of from about 5:95 to about 20:80.

* * * * *